United States Patent
Buford et al.

(10) Patent No.: US 11,582,237 B2
(45) Date of Patent: *Feb. 14, 2023

(54) SYSTEMS AND METHODS FOR PRIVACY-PROTECTING HYBRID CLOUD AND PREMISE STREAM PROCESSING

(71) Applicant: JPMORGAN CHASE BANK, N.A., New York, NY (US)

(72) Inventors: John F. Buford, Princeton, NJ (US); John Roussochatzakis, Hastings on Hudson, NY (US); Anjur Sundaresan Krishnakumar, Princeton, NJ (US); Constantine Barzacanos, New York, NY (US); Uthra J. Ramanujam, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/067,312

(22) Filed: Oct. 9, 2020

(65) Prior Publication Data

US 2021/0029124 A1    Jan. 28, 2021

Related U.S. Application Data

(63) Continuation of application No. 15/882,665, filed on Jan. 29, 2018, now Pat. No. 10,819,710.

(30) Foreign Application Priority Data

Sep. 29, 2017  (GR) .............................. 20170100439

(51) Int. Cl.
*H04L 9/40*     (2022.01)
*G10L 15/22*    (2006.01)
(Continued)

(52) U.S. Cl.
CPC .......... *H04L 63/10* (2013.01); *G06F 21/6245* (2013.01); *G06F 21/6254* (2013.01);
(Continued)

(58) Field of Classification Search
CPC ....... H04L 63/10; H04L 63/105; H04L 67/10; G06F 21/6245; G06F 21/6254;
(Continued)

(56) References Cited

U.S. PATENT DOCUMENTS 6,067,399 A    5/2000   Berger
9,640,194 B1   5/2017   Nemala et al.
(Continued)

FOREIGN PATENT DOCUMENTS

EP    2763136    6/2016

OTHER PUBLICATIONS

International Search Report, dated Nov. 26, 2018, from corresponding International Application No. PCT/US2018/052852.

(Continued)

*Primary Examiner* — Trong H Nguyen
(74) *Attorney, Agent, or Firm* — Greenberg Traurig LLP

(57) ABSTRACT

Systems and methods for privacy-protecting hybrid cloud and premise stream processing are disclosed. In one embodiment, in an information processing device comprising at least one computer processor, a method for processing a voice communication including restricted content may include: (1) receiving from an electronic device, a customer communication; (2) identifying restricted content in the customer communication; (3) masking or marking the restricted content in the customer communication; (4) communicating the customer communication with the masked or marked restricted content to a cloud processor; (5) receiving a processed responsive communication comprising the masked or marked restricted content from the cloud proces-
(Continued)

sor; (6) unmasking or unmarking the restricted content in the processed responsive communication; and (7) communicating the processed responsive communication comprising the unmasked or unmarked restricted content to the electronic device.

19 Claims, 8 Drawing Sheets

(51) Int. Cl.
*G06F 21/62* (2013.01)
*G10L 13/00* (2006.01)
*G10L 15/26* (2006.01)
*H04L 67/10* (2022.01)
*G10L 15/18* (2013.01)

(52) U.S. Cl.
CPC .............. *G10L 13/00* (2013.01); *G10L 15/22* (2013.01); *G10L 15/26* (2013.01); *G10L 15/1815* (2013.01); *H04L 63/105* (2013.01); *H04L 67/10* (2013.01)

(58) Field of Classification Search
CPC ......... G10L 13/00; G10L 15/22; G10L 15/26; G10L 15/1815
See application file for complete search history.

(56) References Cited

U.S. PATENT DOCUMENTS

| | | |
|---|---|---|
| 10,284,885 B1 | 5/2019 | Borras et al. |
| 2004/0019479 A1 | 1/2004 | Hillis et al. |
| 2007/0016419 A1* | 1/2007 | Lee .................... G10L 17/00 704/250 |
| 2012/0150537 A1 | 6/2012 | Abe et al. |
| 2013/0266127 A1* | 10/2013 | Schachter .............. G10L 25/48 379/88.01 |
| 2014/0019467 A1* | 1/2014 | Itoh ..................... G06F 21/6227 707/757 |
| 2016/0063269 A1* | 3/2016 | Liden ..................... G06F 21/60 726/26 |
| 2016/0269371 A1* | 9/2016 | Coimbatore .......... H04L 9/0833 |
| 2017/0011233 A1* | 1/2017 | Xue ........................ G06F 40/30 |
| 2017/0272818 A1* | 9/2017 | Gattis .............. H04N 21/44008 |
| 2018/0350363 A1* | 12/2018 | Cook ....................... G06F 3/165 |
| 2018/0351733 A1 | 12/2018 | Roh et al. |
| 2019/0304506 A1 | 10/2019 | Michaud et al. |

OTHER PUBLICATIONS

Written Opinion of the International Searching Authority, dated Nov. 26, 2018, from corresponding International Application No. PCT/US2018/052852.

* cited by examiner

SYSTEMS AND METHODS FOR PRIVACY-PROTECTING HYBRID CLOUD AND PREMISE STREAM PROCESSING

RELATED APPLICATIONS

This application is a Continuation of U.S. Patent Application Ser. No. 15/882,665, filed Jan. 29, 2018, now U.S. Pat. No. 10,819,710, which claims priority to Greek Patent Application Ser. No. 20170100439, filed Sep. 29, 2017, the disclosure of each is hereby incorporated, by reference, in its entirety.

BACKGROUND OF THE INVENTION

1. Field of the Invention

The present invention generally relates to systems and methods for privacy-protecting hybrid cloud and premise stream processing.

2. Description of the Related Art

The use of third-party public cloud services for voice analytics, natural language understanding, and machine learning on customer messaging and/or customer voice streams may result in the disclosure of sensitive customer and/or business information.

SUMMARY OF THE INVENTION

Systems and methods for privacy-protecting hybrid cloud and premise stream processing are disclosed. In one embodiment, in an information processing device comprising at least one computer processor, a method for processing a voice communication including restricted content may include: (1) receiving from an electronic device, a customer communication; (2) identifying restricted content in the customer communication; (3) masking or marking the restricted content in the customer communication; (4) communicating the customer communication with the masked or marked restricted content to a cloud processor; (5) receiving a processed responsive communication comprising the masked or marked restricted content from the cloud processor; (6) unmasking or unmarking the restricted content in the processed responsive communication; and (7) communicating the processed responsive communication comprising the unmasked or unmarked restricted content to the electronic device.

In one embodiment, the customer communication may include an audio portion and/or a video portion.

In one embodiment, the information processing device may be in a secure network, and the cloud processor may be in a third party network.

In one embodiment, the method may further include permuting the communication before communicating the customer communication to the cloud processor.

In one embodiment the restricted content may include Personally Identifiable Information.

In one embodiment, the step of masking the restricted content may include replacing the restricted content with one of a gap, silence, or a sound.

In one embodiment, the step of marking the restricted content may include replacing the restricted content with a marker. The marker may be selected to maintain the context of the customer communication, and it may be selected from a dictionary comprising words, phrases, and numbers.

According to another embodiment, in an information processing device comprising at least one computer processor, a method for processing a voice communication including restricted content may include (1) receiving from an electronic device, a customer communication; (2) identifying restricted content in the customer communication; (3) masking or marking the restricted content in the customer communication; (4) converting the customer communication comprising the masked or marked restricted content to data; (5) communicating the data with the masked or marked restricted content to a cloud processor; (6) receiving a processed data comprising the masked or marked restricted content from the cloud processor; (7) unmasking or unmarking the restricted content in the processed data; (8) converting the processed data comprising the unmasked restricted content to a processed responsive communication; and (9) communicating the processed responsive communication comprising the unmasked or unmarked restricted content to the electronic device.

In one embodiment, the customer communication may include an audio portion and/or a video portion.

In one embodiment, the information processing device may be in a secure network, and the cloud processor may be in a third party network.

In one embodiment, the method may further include permuting the communication before communicating the customer communication to the cloud processor.

In one embodiment the restricted content may include Personally Identifiable Information.

In one embodiment, the step of masking the restricted content may include replacing the restricted content with one of a gap, silence, or a sound.

In one embodiment, the step of marking the restricted content may include replacing the restricted content with a marker. The marker may be selected to maintain the context of the customer communication, and it may be selected from a dictionary comprising words, phrases, and numbers.

According to another embodiment, a system for processing a voice communication including restricted content may include an electronic device comprising at least one electronic device computer processor and an input device; a masking or marking engine; a speech to text conversion engine; a text to speech conversion engine; and an unmasking or unmarking engine. In one embodiment, the masking or marking engine may receive a customer communication comprising at least one of an audio portion and a video portion received by the electronic device; may identify restricted content in the customer communication; and may mask or mark the restricted content in the customer communication. The speech to text engine may convert the customer communication comprising the masked or marked restricted content to data and communicates the data with the masked or marked restricted content to a cloud processor. The unmasking or unmarking engine may receive a processed data comprising the masked or marked restricted content from the cloud processor and unmasks or unmarks the restricted content in the processed data. The text to speech engine may convert the processed data comprising the unmasked restricted content to a processed responsive communication.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
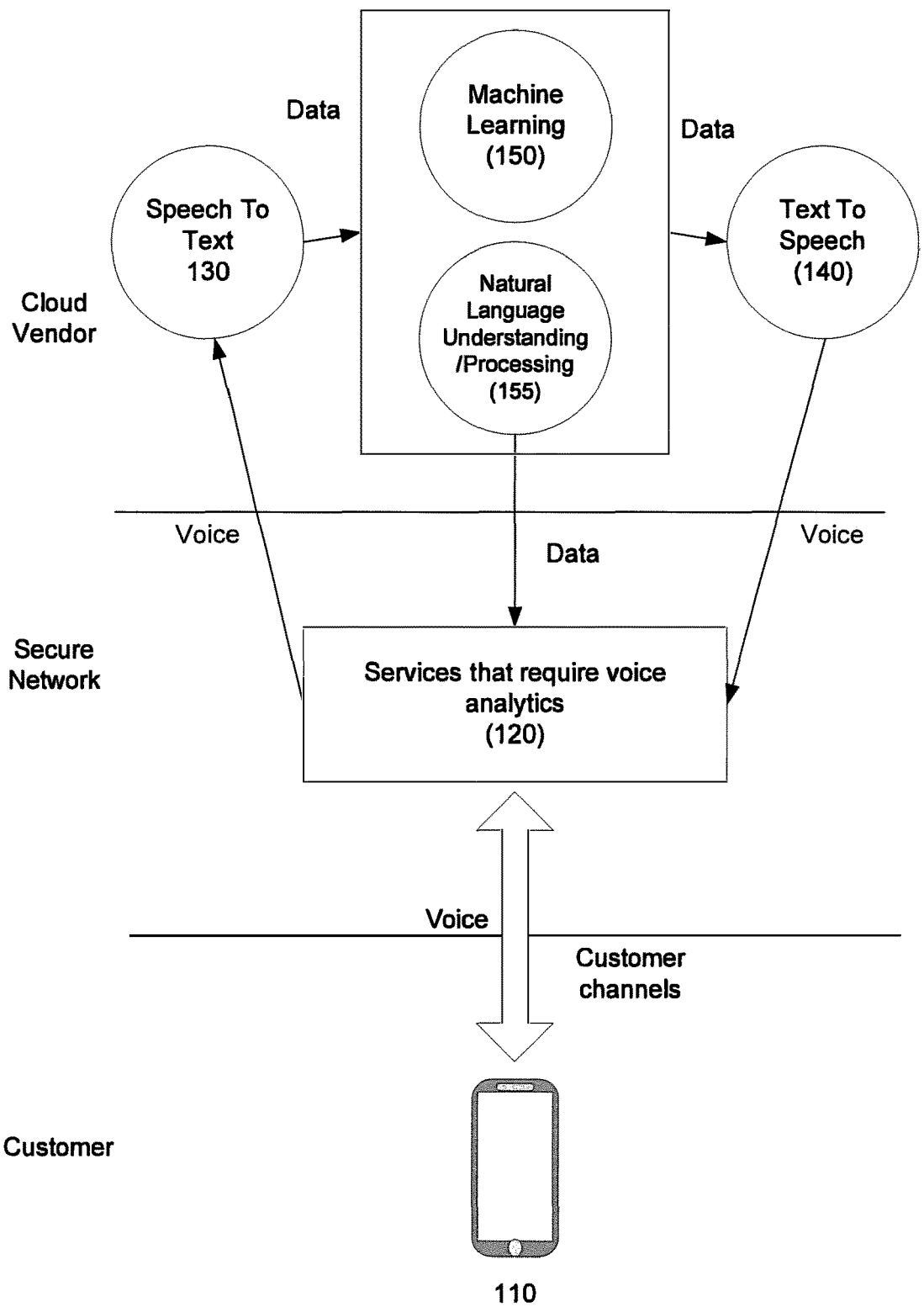
FIG. 1 depicts a first known architecture for voice personally identifiable information detection and redaction.
Figure 2:
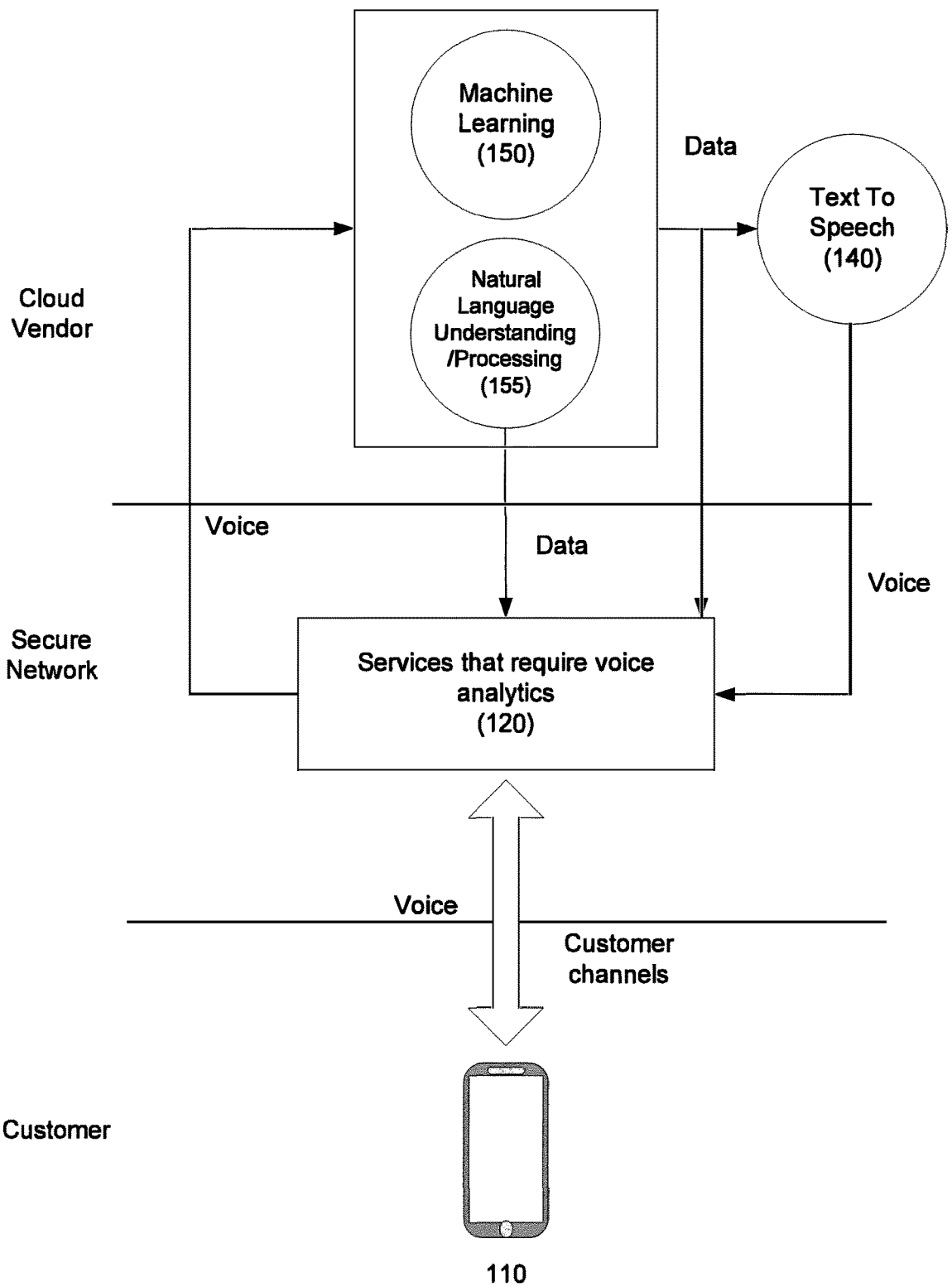
FIG. 2 depicts a second known architecture for voice personally identifiable information detection and redaction.

Referring to FIGS. 1 and 2, known architectures for voice Personally Identifiable Information, or "PII," detection and redaction are disclosed. PII detection can treat proper names, places, numbers, dates, addresses as keywords. Keyword spotting is a specialized problem in speech recognition. It is usually designed with a simple structure which is suitable for low-power systems, and may use neural networks. Known systems often increase the rate of any false positives to limit exposure of missed PII. In typical keyword spotting applications, accuracy is more important than finding all occurrences of a keyword.

In FIG. 1, a customer may provide a voice input to a software application executed by electronic device 110, which may be any suitable electronic device, including, for example, a smartphone. The voice is communicated to one or more services that requires voice analytics 120. Services 120 which may be located at a backend. The voice is then communicated to speech-to-text engine 130, which converts the voice to data.

In one embodiment, the data may include text, metadata, models, mappings, dictionaries, ontologies, lists, etc.

Speech-to-text engine 130 may be provided by a third-party cloud vendor. The data is then communicated to one or more engines that may provide machine learning 150 and/or natural language understanding/processing 155. The processed data is then returned to services 120 and to the vendor's text-to-speech engine 140, which then coverts the data to voice and returns voice to services 120. The voice response may then be communicated to electronic device 110 over the customer channels.

In FIG. 2, the customer may provide data to services 120, and the data may be processed by the cloud vendor's engines 150 and/or 155 without requiring the use of a speech-to-text engine. The processed data is provided to services 120, and then converted to voice by text-to-speech engine 140. The customer may receive the voice response on electronic device 110.

Notably, in the prior art implementations, the cloud vendor receives the personally identifiable information that is included in the data or in the voice provided by services 120.

Embodiments disclosed herein may be used for voice and text stream processing models, including real-time and batch processing. Embodiments may determine which streams, from which customers, and/or which segments of the streams meet a confidence and risk threshold for public cloud processing. Embodiments may process confidential/sensitive information, such as personal identifiable information, business information, etc. in a way that the context needed for natural language processing is not disrupted, and in a way that re-insertion of that confidential/sensitive information in the resulting processed stream can be properly done. For example, confidential information may be extracted, redacted, substituted, and/or replaced.

In one embodiment, a multi-stage processing architecture may be used in which a secure processing portion (e.g., on-premises) and a third-party processing portion (e.g., cloud) may be used together. In one embodiment, the secure portion may perform, for example, data protection transformations and other processing steps. It may send cleaned and/or transformed data to the third-party portion, which cannot invert or transform cleaned and transformed data to produce original source data in part or whole, either from individual records or from aggregate records.

Embodiments may be combined with other techniques for securing public cloud infrastructure, such as encrypt in place, virtual private cloud, geographical placement, inflight/in-transit encryption, etc.

In one embodiment, the cloud processing may include voice analytics, sentiment analysis, natural language understanding, insight discovery, tone analysis, personality insights, visual recognition, and machine learning. The voice and/or data streams may be individual, or omni-channel. For example, the streams may include customer messaging, customer voice and/or streams, and/or any customer channel interactions.

Embodiments disclosed herein protect customer PII and business defined categorical data from direct and indirect exposure, and may reduce the risk associated with direct exposure and possible inference outside premises.

The following terms/phrases used herein are defined as follows:

Categorical data—may include industry-specific terminology that may have regulatory or legal significance, is privileged, or confidential data. Examples may include a Product_ID, geolocation, referential names, and noun/verbs such as <payment>, <checking/s>, <saving/s>, <mortgage>, <travel>, <transaction>, etc.

"Personally Identifiable Information" or "PII"—may include any information that can be used to distinguish or trace an individual's identity, such as name, social security number, date and place of birth, mother's maiden name, or biometric records; and (2) any other information that is linked or linkable to an individual, such as medical, educational, financial, and employment information. PII may include categorical data.

"Location"—may include a position and/or movement of user at a given time, such as address, GPS coordinates, landmarks, etc.

"Customer channels"—may include one or more of voice and/or video to agent, voice to IVR, voice to virtual assistant (VA), chat with agent, chat with VA, web site navigation, web site interaction, mobile app interaction, social network site activity, email, instant message, etc.

"Transformation" may refer to the anonymization of data. It may be achieved, for example, by conversion, by extraction, averaging, filling, normalization, inversion, combination, de-combination, scaling, sub-sampling, transformation, correlation, thresholding, etc.

In embodiments, one or more transformation may be applied to the raw data before it is send to the cloud for processing. The transformation(s) may be of many types, but may have one or more of the following characteristics: (1) is not easily reversible (except by the party applying the transformation); and (2) preserves patterns of interest to parties of interest that will be extracted by the machine learning processes in the cloud.

Examples of suitable transformations include (1) a deep-learning neural network model, where one or more of the initial layers may be implemented on premises, and others are implemented in the cloud (the exact line of separation may depend on specific instances); (2) a codebook that maps a defined set of words or patterns (e.g., PII, trade-specific terms etc.) into a different set that obfuscates the domain information but preserves the inherent structure (e.g., grammatical structure for transcribed conversations).

In another embodiment, obfuscation may be used. For example, words from a dictionary of words, phrases, numbers, etc. (World_real) that are used in the actual communication may be replaced with similar parts of speech from a coded dictionary World_replace.

In one embodiment, a per-customer dictionary of customer specific PII as the keywords to be spotted may be used.

In another embodiment, another defense against invertibility is the use of misdirection by mapping categories of words in such a way that the insights obtained are useful only by reversing the mapping. The mapping may be a secret of the organization.

In one embodiment, obfuscation based on a codebook may be used. This may be useful so long as the mapping does not "confuse" the grammar and the semantic outcome Natural Language Understanding, or NLU, while it still changes the insight from the machine learning. In general, categorical data belonging to the same class based on grammatical and semantic characteristics are mapped or exchanged. For example, categorical data may be exchanged within a color set (e.g., red, green, yellow, etc.), holidays (e.g., Christmas, Easter, Mother's day, etc.), store locations (e.g., store ID1, store ID2, etc.), etc. Such an exchange does not confuse the grammatical analysis and semantic outcome, but it does change the insight.

An example of the insight alteration is as follows: The machine learning algorithm determines the following insight "People who bought green sweaters before Mother's day will exchange them in 3 weeks from purchase time." Assuming that Red had been exchanged with Green (as they belong to the color set), and Christmas had been exchanged with Mother's Day (in the holiday set) then the right insight after remapping would be "People who bought red sweaters before Christmas will exchange them in 3 weeks from purchase time."

In one embodiment a separate trained neural network instance per active customer may be used. For example, from a pool of untrained neural networks, an available neural network may be trained at the beginning of a session with a specific customer, using that customer's PII dictionary as part of the training set.

Text filtering is known for filtering PII or items of interest. For example, a dictionary lookup process may be used. For such a process, a text stream may be segmented; misspellings may be processed; each word may be stemmed; and a dictionary including customer PII and other items to be filtered are applied.

A contextual approach may also be used to filter PII or items of interest. For example, a text stream may be segmented and parsed, a dictionary lookup including part of speech context may be used.

Embodiments may include cloud-based machine learning (ML) model design, training, testing, and deployment, stream analytics, and artificial intelligence tools such as NLU, NLP, sentiment analysis, machine vision, image recognition, Speech-To-Text, Text-To-Speech, speech processing, and automatic language translation.

The ML model design, training, and testing may involve data set analysis, feature engineering, algorithm selection, and evaluation.

Embodiments may address scenarios, including, where data that may be used to train and test a cloud-based machine learning model may contain PII; where data being processed by a deployed cloud-based machine learning model may contain PII; and where data being processed by a cloud-based AI or streaming analytics solution may contain PII.

Figure 3:
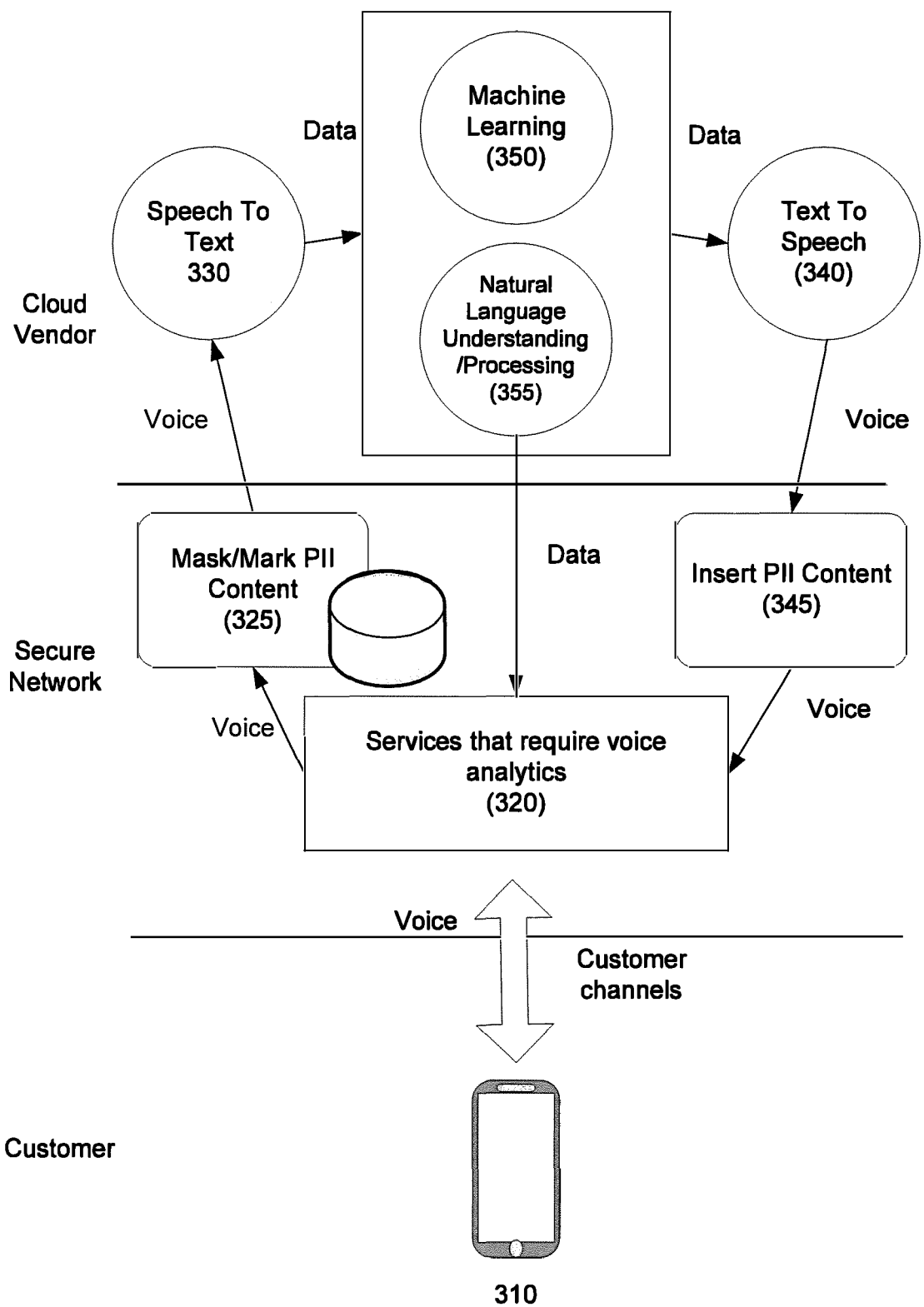
FIG. 3 depicts a voice-to-cloud processing architecture according to one embodiment.

Referring to FIG. 3, a voice-to-cloud processing architecture is disclosed according to one embodiment. For example voice may be received by service 320 from electronic device 310 over one or more customer channels. In one embodiment, electronic device 310 may be any suitable electronic device that may receive a voice input, including, for example, workstations, desktop computers, laptop computers, tablet computers, smartphones, Internet of Things (IoT) appliances, kiosks, set top devices, etc.

Information communicated over customer channels may include voice, video, location streaming, biometrics, and other real-time sensed customer data. In one embodiment, video and sensor processing in the secure network could generate additional inbound text streams.

Additional paths from the secure network to the cloud vendor may carry media streams for processing on the cloud including detection, recognition, training, testing, understanding, correlation, etc.

In one embodiment, electronic device 310 may execute a software application or program (not shown) that may receive a communication, such as an audio and/or video communication, from a user.

Service 320 may provide the voice to masking/marking engine 325, which may identify restricted data, such as PII content, and mark or mask the content as discussed above.

A comparison of the use of voice masking and markers is as follows. An original message may be: "Hi, my name is Terri Swanson and my SS # is 123-45-6789 and my birth date is Apr. 12, 1972. I have a question about my checking account ending in 3456".

When masking is applied, an exemplary processed message may be: "Hi, my name is <gap/beep> and my SS # is <gap/beep> and my birth date is <gap/beep>. I have a question about my checking account ending in <gap/beep>". Masking may result in lost grammatical constructs which may negatively impact the quality of natural language understanding. It may be more difficult to tie transmitted information back to the customer.

When marking is applied, an exemplary processed message may be "Hi, my name is [marker name] and my SS # is [marker SS #] and my birth date is [marker date]. I have a question about my checking account ending in [marker digit pattern]". Marking may maintain the grammatical construct of the message, and may simplify re-insertion of context in the response. It simplifies the tying of transmitted information back to the customer. A random marker may be re-used in a session.

Notably, the markers may be randomly generated, or may be selected from a dictionary of relevant words, phrases, or numbers so that the context is maintained (e.g., names are replaced with names, places with places, numbers with numbers, etc.).

In one embodiment, standard markers may be used. For example, the same names may be used (e.g., Tom Smith is used for all names, 111-11-1111 is used for all social security numbers, etc.).

Engine 325 may then provide the marked or masked voice to the cloud vendor's speech-to-text engine 330, which may convert the masked or marked voice to data for processing by machine learning engine 350 and/or natural language understanding/processing engine 355.

The processed data may be provided to service 320 and to text-to-speech engine 340. Text-to-speech engine 340 may convert the data to voice, which then may be provided to insert PII content engine 345, which may re-insert the PII content into the voice. The voice may then be provided to service 320, which may provide the voice response to electronic device 310.

It should be noted that although mask/mark PII content engine 325 and insert PII content engine 345 are depicted as separate engines, they may be a single engine that performs these functions.

Figure 4:
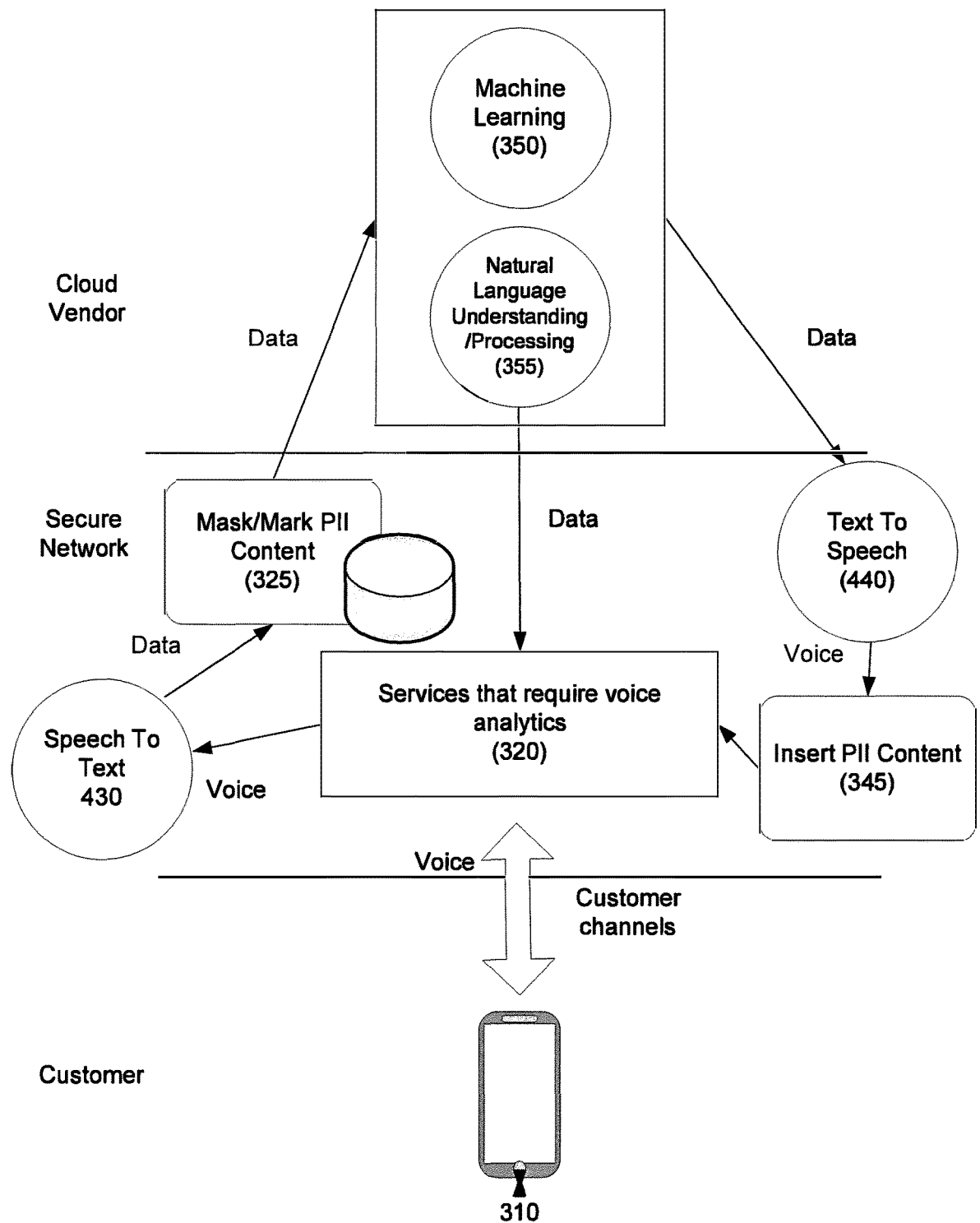
FIG. 4 depicts a text-to-cloud with speech-to-text provided on premises according to another embodiment.

Referring to FIG. 4, a text-to-cloud with speech-to-text provided on premises is disclosed according to one embodiment. This embodiment is similar to that of FIG. 3 except that speech-to-text engine 430 and text-to-speech engine 440 are provided in the secure network. Thus, mask/mark PII content engine 325 marks data rather than voice.

In one embodiment, machine learning processing nodes may be separated in a secure pre-processor that may preserve the overall integrity of the host machine learning, but obfuscates the target discovery objective. For example, the processing may be divided into secure processing (e.g., a front end) and third party processing (e.g., backend, such as cloud processing). The front end may convert a voice/data stream into one or more feature vector and statistical pattern (s). In one embodiment, the input pattern (containing PII) cannot be discovered by inverting the output of the front end. The output of the front end, which has been effectively anonymized, may then be communicated to the backend.

In another embodiment, an aggregate of the input records may be pre-processed. For example, an aggregate collection of records (e.g., a feature vector or statistical pattern) may be sent instead of raw data. An example is the output of a layer of a neural network.

Figure 5A:
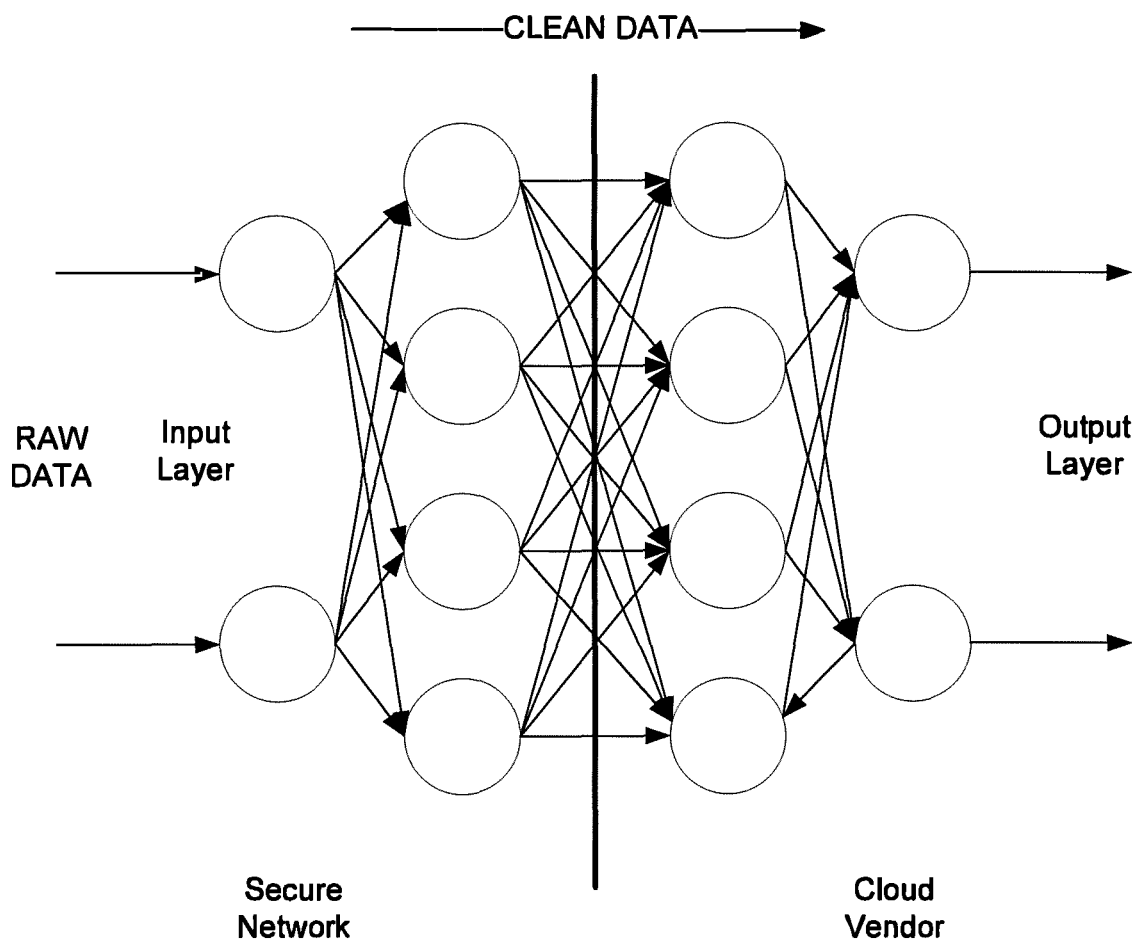
FIGS. 5*a* and 5*b* depict distributed deep learning with cleaned data embodiments.
Figure 5B:
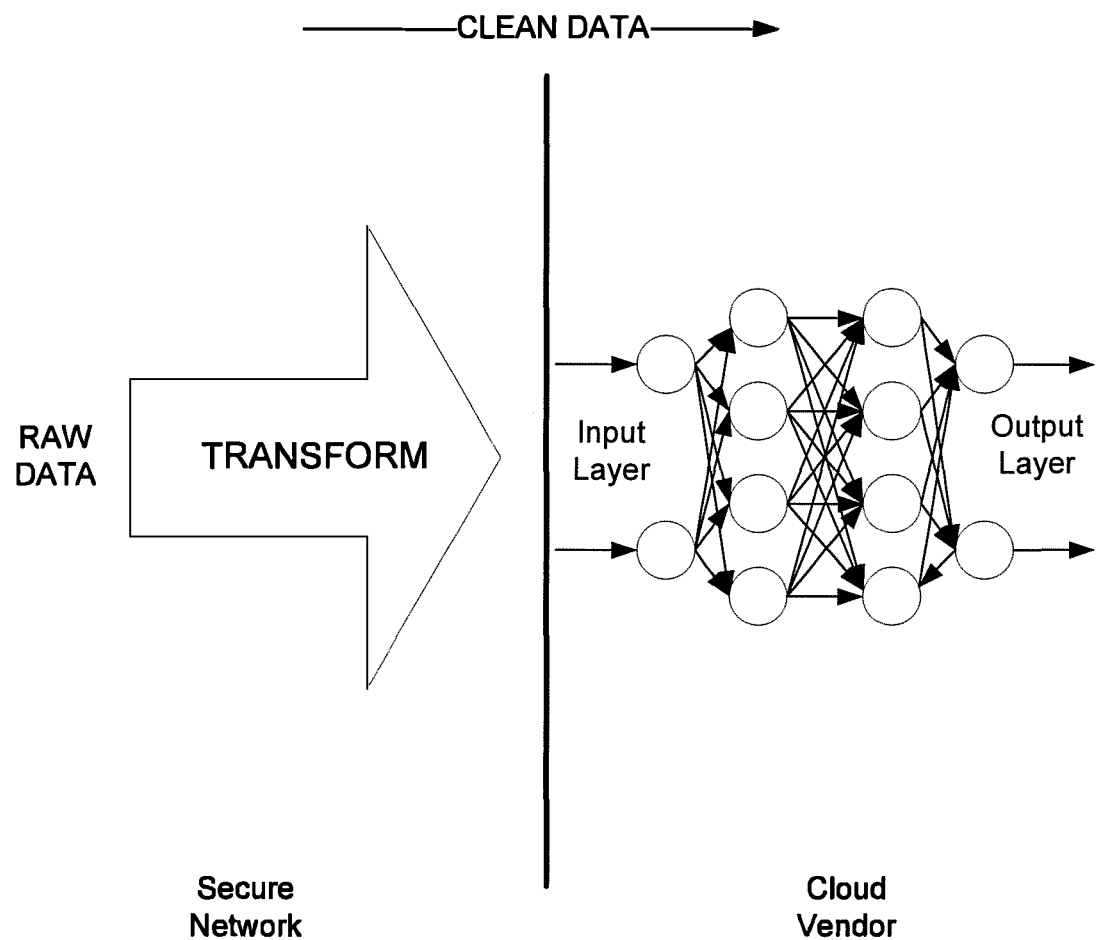

Referring to FIGS. 5A and 5B, embodiments depicting distributed deep learning with cleaned data are disclosed. In one embodiment, depicted in FIG. 5A, raw data may be received by a secure network, which may apply a neural network comprising one or more layers to clean the data before it is provided to the cloud vendor, such as a third party cloud vendor. In another embodiment, raw data may be transformed to clean the data before being provided to the cloud vendor.

In one embodiment, back propagation may be permitted, and the clean data is non-invertible to the raw data (except to the entity in the secure network). In addition, there may be no inferences from the clean data to the raw data. In one embodiment, there may be low latency between the two stages, and there may be a low level of network traffic.

Figure 6:
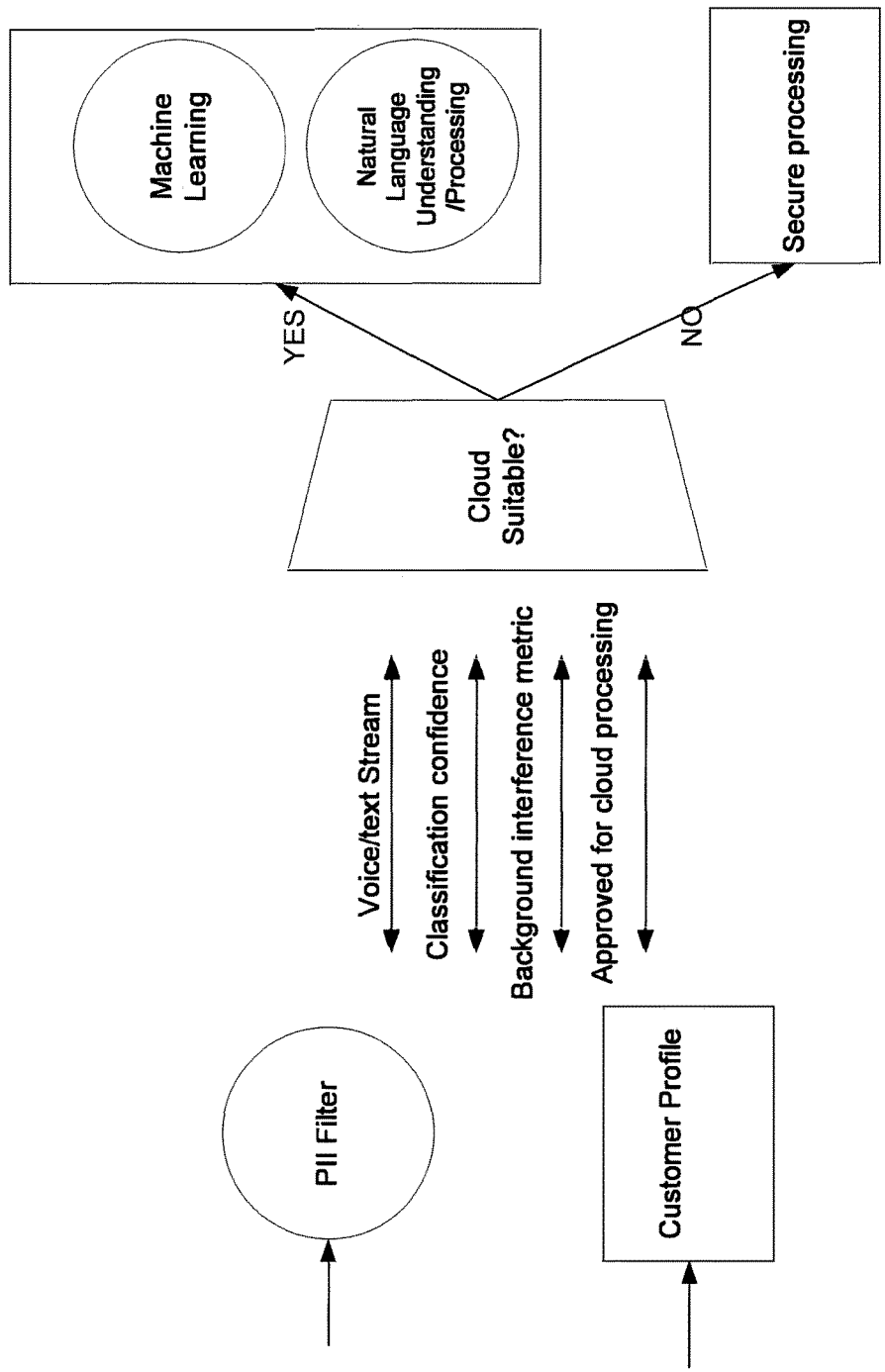
FIG. 6 depicts an exemplary improvement in PII classification according to one embodiment.

Referring to FIG. 6, an example of improving PII classification is provided. Assuming that complete (e.g., 100%) PII removal not guaranteed, the risk or impact of PII may be reduced by improve algorithms for PII removal, such as by using machine learning. In addition, customer streams may be segmented according to, for example, the ability to recognize PII (e.g., speech quality, background noise, etc.), customer value (e.g., high value customers versus low value customers), providing certain segments to cloud processing while processing other segments internally, etc.

In another embodiment, invertibility may vary by type of neural network. For example, convolutional neural networks (CNN) may include images, video, speech, and audio. Recurrent neural networks (RNN) may include natural language processing (NLP).

In one embodiment, there are various neural network model types that may vary by use of feedback, number of node interconnections, back propagation learning algorithm, number of hidden layers, bias nodes, and activation functions. Consequently, techniques such as partition the network, feature encoding, and permuting the inputs, may depend on the specifics of the given neural network instance as to where they can be used.

Additionally, the neural network computation may be implemented as a data flow or a control flow programming architecture. In the case of data flow, selected computational nodes in the graph may be placed either in the cloud or within the secure network. In the case of control flow, the control steps need to be divided into those that will run on cloud versus those that will run within the secure network.

Figure 7:
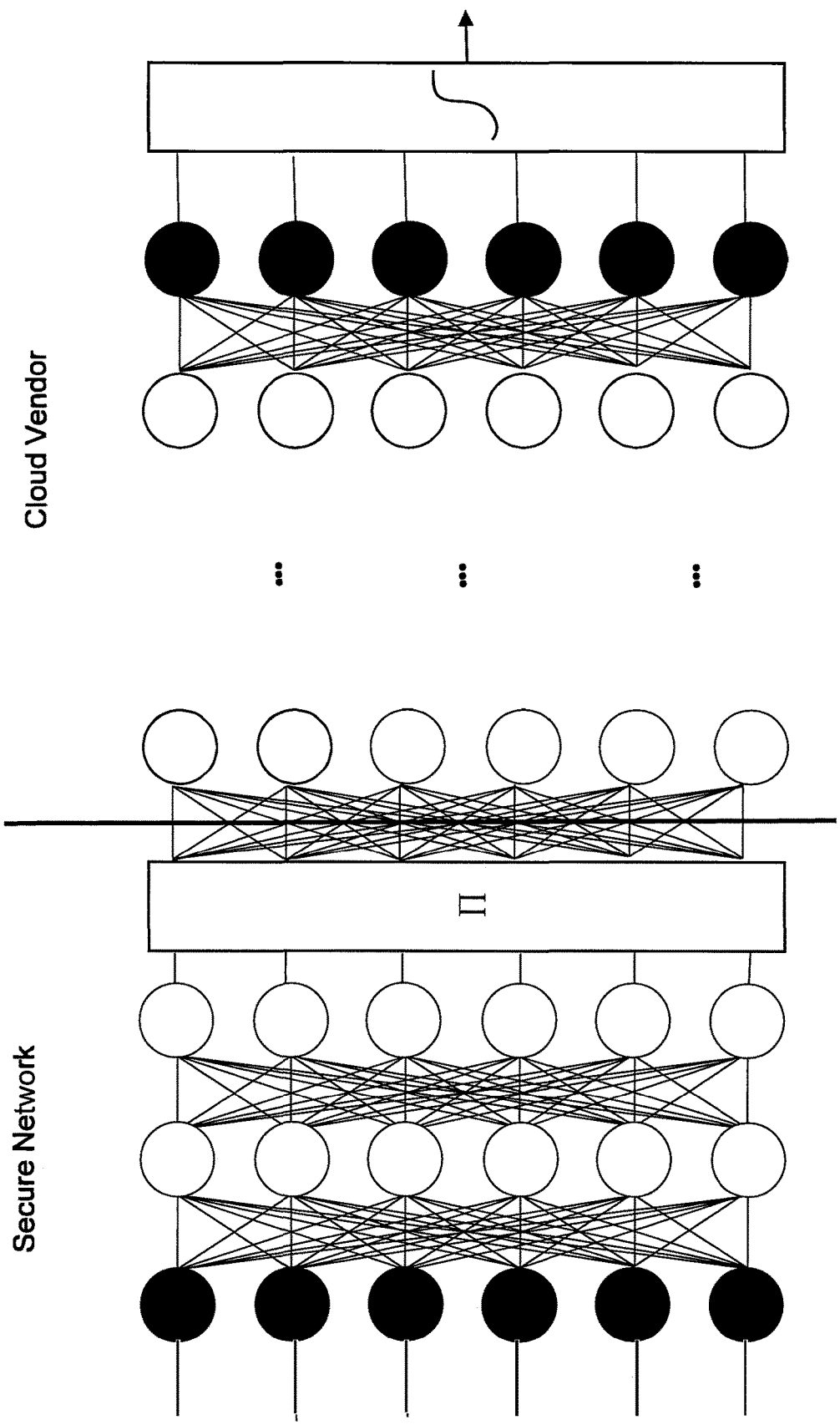
FIG. 7 depicts an exemplary improvement in PII classification including a permutation against invertibility according to one embodiment.

In one embodiment, a permutation against invertibility may be used. For example, referring to FIG. 7, permutation H, may be known only to the organization. The defense rests on the following assumptions, specifically that applying the permutation on the forward path and its inverse on the reverse (for weight updates) does not affect learning or rate of convergence, and invertibility is thwarted, or at least made significantly hard, if the permutation layer is removed (guessing becomes hard for large feature size as $n!\sim(n/e)^n$ and feature sizes are typically a few hundreds or even thousands.

In embodiments, as the feature set size n grows, guessing becomes exponentially harder. Problems with exponential growth are generally considered intractable.

Techniques currently known for invertibility depend on knowledge of the exact structure of the network. Applying a permutation in both directions should not affect learning and subsequent application of the model. However, without knowing the permutation, a third party does not have the exact network and will have to guess it.

Since the number of permutations grows exponentially with the number of features, this becomes an intractable problem when the number of features is large (of the order of hundreds). This provides a defense against invertibility.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a graphics processing unit (GPU), a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for processing a voice communication, comprising:
   in an information processing device comprising at least one computer processor:
   receiving from an electronic device, a customer communication comprising a customer voice communication;
   identifying restricted content in the customer voice communication;
   transforming the restricted content in the customer voice communication using a deep learning neural network model;
   communicating the customer voice communication comprising the transformed restricted content to a cloud processor to perform a machine learning process or natural language process;
   receiving a processed responsive communication comprising the transformed restricted content from the cloud processor;
   restoring the transformed restricted content in the processed responsive communication; and
   communicating the processed responsive communication comprising the restored restricted content to the electronic device.

2. The method of claim 1, wherein the information processing device is in a secure network, and the cloud processor is in a third party network.

3. The method of claim 1, wherein the restricted content comprises Personally Identifiable Information.

4. The method of claim 1, wherein the transformation replaces the restricted content with one of a gap, silence, or a sound.

5. The method of claim 1, wherein the transformation replaces the restricted content with a marker.

6. The method of claim 5, wherein the marker is selected to maintain a context of the customer communication.

7. The method of claim 5, wherein the marker is selected from a dictionary comprising words, phrases, and numbers.

8. The method of claim 1, wherein the restricted content is identified using a dictionary of restricted content keywords.

9. A method for processing a voice communication, comprising:
   in an information processing device comprising at least one computer processor:
   receiving from an electronic device, a customer communication comprising a customer voice communication;
   identifying restricted content in the customer voice communication;
   transforming the restricted content in the customer voice communication using a codebook that maps a defined set of words and patterns into a different set of words and patterns that obfuscates domain information but preserves an inherent structure of the customer voice communication;
   communicating the customer voice communication comprising the transformed restricted content to a cloud processor to perform a machine learning process or natural language process;
   receiving a processed responsive communication comprising the transformed restricted content from the cloud processor;

restoring the transformed restricted content in the processed responsive communication; and communicating the processed responsive communication comprising the restored restricted content to the electronic device.

10. The method of claim 9, wherein the information processing device is in a secure network, and the cloud processor is in a third party network.

11. The method of claim 9, wherein the restricted content comprises Personally Identifiable Information.

12. The method of claim 9, wherein the codebook is specific to the customer.

13. The method of claim 9, wherein the transformation replaces the restricted content with content having a same grammatical characteristic and a same semantic characteristic.

14. The method of claim 9, wherein the transformation changes an insight in the customer voice communication.

15. The method of claim 9, wherein the restricted content is identified using a dictionary of restricted content keywords.

16. A method for processing a voice communication comprising:

in an information processing device comprising at least one computer processor: receiving from an electronic device, a customer communication comprising a customer voice communication;

identifying restricted content in the customer voice communication;

transforming the restricted content in the customer voice communication using a dictionary by replacing the restricted content in the customer voice communication with content having similar parts of speech;

communicating the customer voice communication comprising the transformed restricted content to a cloud processor to perform a machine learning process or natural language process;

receiving a processed responsive communication comprising the transformed restricted content from the cloud processor;

restoring the transformed restricted content in the processed responsive communication; and communicating the processed responsive communication comprising the restored restricted content to the electronic device.

17. The method of claim 16, wherein the dictionary is specific to the customer.

18. The method of claim 16, wherein the transformation changes an insight in the customer voice communication.

19. The method of claim 16, wherein the restricted content is identified using a dictionary of restricted content keywords.

* * * * *